United States Patent
Soi

(10) Patent No.: US 8,816,020 B2
(45) Date of Patent: Aug. 26, 2014

(54) METHOD TO PRODUCE POLYUREA AND POLYURETHANE BY USING LIQUID PLANT OIL BASED POLYOL

(71) Applicant: Hoong Seng Soi, Selangor (MY)

(72) Inventor: Hoong Seng Soi, Selangor (MY)

(73) Assignee: Malaysian Palm Oil Board, Kajang, Selangor (MY)

( * ) Notice: Subject to any disclaimer, the term of this patent is extended or adjusted under 35 U.S.C. 154(b) by 0 days.

(21) Appl. No.: 13/655,083

(22) Filed: Oct. 18, 2012

(65) Prior Publication Data

US 2013/0102737 A1  Apr. 25, 2013

(30) Foreign Application Priority Data

Oct. 20, 2011  (MY) .............................. PI2011005059

(51) Int. Cl.
| | |
|---|---|
| C07C 67/31 | (2006.01) |
| C08G 18/83 | (2006.01) |
| C08G 18/76 | (2006.01) |
| C08G 18/36 | (2006.01) |
| C08G 18/10 | (2006.01) |
| C08G 18/48 | (2006.01) |

(52) U.S. Cl.
CPC ........ C08G 18/4891 (2013.01); G08G 18/4804 (2013.01); C08G 18/36 (2013.01); C08G 18/10 (2013.01)
USPC .............................. 525/453; 528/85; 554/149

(58) Field of Classification Search
CPC .... C08G 18/10; C08G 18/5024; C08G 18/36; C08G 18/4804; C08G 18/4891
USPC .............................. 525/453; 528/85; 554/149
See application file for complete search history.

(56) References Cited

U.S. PATENT DOCUMENTS

| | | | |
|---|---|---|---|
| 5,270,383 A | * 12/1993 | Fisch et al. ..................... | 524/812 |
| 7,691,914 B2 | * 4/2010 | Abraham et al. ............. | 521/172 |
| 2012/0214938 A1 | * 8/2012 | Mannari ....................... | 524/591 |

FOREIGN PATENT DOCUMENTS

WO  WO 2010/098651 A1  9/2010

OTHER PUBLICATIONS

Sharma et al. (One-pot synthesis of Chemically Modified Vegetable Oils, J. Agricultural and Food Chemistry, 56, p. 3049-3056, Apr. 2008).*
Petrovic (Polymers from Biological Oils,Contemporary Materials, Scheme 3 and 4 pp. 41 and 50, Jul. 2010).*
Huntsmann Jeffamine Brochure 2007.*
E. Del Rio et al., "Polymerization of Epoxidized Vegetable Oil Derivatives: Ionic-Coordinative Polymerization of Methylepoxyoleate," Journal of Polymer Science: Part A: Polymer Chemistry, vol. 000. 000-000 (2010) © Wiley Periodicals, Inc.
Zengshe Liu et al., "Ring-Opening Polymerization of Epoxidized Soybean Oil," J Am Oil Chem Soc (2010) 87:437-444.
Lligadas et al., "Synthesis and Characterization of Polyurethanes from Epoxidized Methyl Oleate Based Polyether Polyols as Renewable Resources," Journal of Polymer Science: Part A: Polymer Chemistry, vol. 44, 634-645 (2006).

* cited by examiner

*Primary Examiner* — Randy Gulakowski
*Assistant Examiner* — Christopher M Rodd
(74) *Attorney, Agent, or Firm* — Greer, Burns & Crain, Ltd.

(57) ABSTRACT

A method of producing liquid polymeric polyols from epoxidized plant oils by ring-opening polymerization in an organic solvent in the presence of a catalyst to yield the desired polyols at room temperature. The properties of the polymeric polyols depend on the type of plant oil used as starting material. Typically, polymeric content of the purified plant oil based polyols ranges from 65% to 90%. The hydroxyl value and the acid value ranges from 30 to 90 mg KOH/g sample and 1 to 14 mg KOH/g sample respectively. The average molecular weight $M_n$ ranges from 800 Da to 16000 Da. The liquid plant oil based polymeric polyols are reacted with excess diisocyanate to produce isocyanate terminated prepolymer. Subsequently, the prepared prepolymer is reacted with diol or diamine to polyurethane and polyurea respectively.

19 Claims, No Drawings

METHOD TO PRODUCE POLYUREA AND POLYURETHANE BY USING LIQUID PLANT OIL BASED POLYOL

FIELD OF INVENTION

The present invention relates to a method to produce liquid polymeric polyols from epoxidized plant oils by ring-opening polymerization in an organic solvent in the presence of a catalyst to yield the desired polyols and using these polyols to produce polyurea and polyurethane.

BACKGROUND ART

Liquid plant oil based polyol are polyols derived from vegetable oils like palm oil, soybean oil, coconut oil, sunflower oil, olive oil and canola oil. It is well-known in the art as numerous prior art has disclosed different approaches in producing polyols from plant oil. Most of the reported prior art revolves on methods that involves catalytic ring opening of the epoxy group of epoxidized oil to yield hydroxyl functionality.

The other more established method was hydroformylation that involves reacting plant oil derivatives such as fatty acid methyl ester (FAME) with synthetic gas in the presence of rhodium based catalyst.

It has been reported in Lligadas et al., *Journal of Polymer Science Part A: Polymer Chemistry*, (2006) that oligomeric polyols can be made from epoxidized methyl esters of plant oil's fatty acids. Epoxidized methyl oleate was oligomerized at room temperature for 1 hour in the presence of fluoroantimonic acid ($HSbF_6$). Subsequently, the ester groups of the oligomers were partially reduced with lithium aluminium hydride ($LiAlH_4$) to give primary alcohols. The oligomerization process yielded mostly trimer, tetramer and pentamer of methyl oleate with molecular weight ranges ($M_n$) from 930 to 1230 and hydroxyl value (OHV) ranges from 100 to 300 mg KOH/g sample.

Del Rio et al., in *Journal of Polymer Science Part A: Polymer Chemistry* (2010) also reported a process to produce plant oil based polyol from epoxidized methyl oleate. In this case, the epoxidized methyl oleate was oligomerized with various ionic-coordinative initiators such as tetraisobutylaluminoxane (TIBAO), TIBAO/$^iBu_3Al$ and Vandenberg Catalyst [$(C_2H_5)_3Al/H_2O$]. All the reactions were conducted under dry argon using standard Schlenck techniques. The initial reaction temperature was 0° C., and then it was raised and maintained at 25° C. for 72 hours. The resulting white rubber-like polymers have molecular weight ranges ($M_n$) from 6000 Da to 8000 Da with predominantly linear polyether polyols.

PCT Publication No. WO 2004/096744 A2 has disclosed another method of making polyol from methyl ester which is known as hydroformylation. In this method, methyl linoleate was reacted with synthesis gas (1:1 mixture of hydrogen and carbon monoxide gases) in the presence of a rhodium based catalyst. The reaction was conducted at 400 psig pressure and 90° C. for 23 hours. The resulting aldehyde functional group of the hydroformylated methyl linoleate was then reduced with hydrogen gas to yield an alcohol group. The next step in the process involved the transesterification of the ester group of the hydroxyl functionalized methyl linoleate with polyether polyol to yield oligomerized methyl linoleate. The polyols produced from this method have hydroxyl value ranges from 25 to 80 mg KOH/g sample. However, there was no mention of the the molecular weight of the polyol.

Alternatively, renewable polyols can also be derived directly from the plant oil itself. U.S. patent application Ser. No. 60/786,594 has disclosed a process to make polyol from palm oil through a two steps process namely epoxidation and alcoholysis. The epoxidation was carried out at 70° C. for 9 hours with peroxy acids, preferably peracetic acid, which is prepared from hydrogen peroxide and the corresponding acid either in separate step or in situ to yield epoxidized palm oil. Then, the epoxidized palm oil was subjected to alcoholysis reaction, which was carried out at 70° C. for 1 hour with methanol or water as the ring-opener in the presence of fluoroboric acid as the catalyst. Further reaction between the hydroxyl groups formed during the alcoholysis reaction with unreacted epoxy groups yields oligomeric polyols, which mostly comprise of dimers and trimers of triglycerides. The oligomers content of the polyol was about 55% and the hydroxyl value of the polyol was about 55 mg KOH/g sample. However, the molecular weight of the polyol was not disclosed.

Similarly, U.S. Publication No. 20080293913 also disclosed a process to make polyol from a mixture palm kernel olein and soy bean oil through a two steps process namely epoxidation and alcoholysis. The epoxidation was conducted at 50° C. for 3 hours with peroxy acids, preferably performic acid, which was prepared from hydrogen peroxide and formic acid in a separate step to yield epoxidised plant oil. The epoxidized plant oil was then subjected to alcoholysis reaction with ethylene glycol (ring opener) at 60° C. for 1 hour and the reaction was catalysed by boron trifluoride etherate. The polyols produced from this method have hydroxyl value ranges from 70 to 130 mg KOH/g sample. The molecular weight of the polyol was not disclosed.

Liu et al., in Journal of the American Oil Chemists Society (2009) disclosed the use of boron trifluoride as the catalyst for ring opening of epoxidized plant oil. In this method, epoxidized soya bean oil was dissolved in methylene chloride and cooled to 0° C. Then, boron trifluoride etherate was added drop-wise and the reaction mixture was stirred at 0° C. for 3 hours. The products from this method were cross-linked polymers that were insoluble in most solvent. The same reaction could be conducted using liquid carbon dioxide instead of methylene chloride. The cross-linked polymers were subjected to soxhlet extraction and the soluble fractions of the cross-linked polymer ranges from 1% to 27% depending on reaction condition. The molecular weight of the soluble fractions ranges from 1600 Da to 3800 Da.

PCT Publication No. WO 2010/098651 A1 disclosed a method for epoxidation of plant oil, particularly to epoxidized palm oil and palm kernel oil. The chemo-enzymatic method of epoxidation of palm oil and palm kernel oil were performed with the presence of lipase as biocatalyst. The method of epoxidation of plant oil as disclosed comprises:

a) dissolving a mixture of oil in a non-polar solvent
b) adding enzymes (lipase) to the mixture
c) adding hydrogen peroxide gradually at a time interval
d) stirring the mixture
e) filtering the mixture for removal of enzyme
f) washing the mixture with a polar solvent
g) removing the solvent by evaporation Despite the fact that the reported prior art in preparing plant oil based polyol are diverse, it is evident that the synthesis of polyols from plant oil has several drawbacks. One of the drawback is the use of highly sensitive catalysts such tetraisobutylaluminoxane (TIBAO), TIBAO/$^iBu_3Al$ and Vandenberg Catalyst [$(C_2H_5)_3Al/H_2O$], which need to be used under argon atmosphere. In addition, the use of the highly corrosive fluoroantimonic acid ($HSbF_6$) is also another major problem. The use of these catalysts required specialized equipment for handling which increases the cost of production. On a separate issues related hydroformylation process, is the use of high pressure in the process of making plant oil based polyols. Again, this will required specialized equipment for the high pressure reaction condition which increases the cost of production.

Another drawback of the literature is the use of reaction temperature in the range of 60° C. to 70° C. for the epoxy ring opening reaction. The reaction will be more economical if it could be conducted at room temperature.

Furthermore, another drawback of the literature is the need to use ring opener such as water, methanol and ethylene glycol in the epoxy ring opening reaction in order to produce liquid polyol from epoxidsed plant oil. In the absence of these ring openers, the product of the reaction will be cross-linked polymer, which is not suitable for polyurethane application. The use of ring opener causes the yield of oligomers in the product to be less than 60%, which is not very economical for commercial production. In addition, the use of ring opener also increases the cost of production.

Present invention aims to achieve several objectives based on the embodiments of the specification which includes: i. to produce liquid plant oil based polyols without using highly sensitive catalysts to avoid the need for any specialized equipment for the process ii. to produce the liquid plant oil based polyols at atmospheric pressure and room temperature in order to keep the production cost at minimal iii. to produce liquid plant oil based polyols by ring opening of epoxidized plant oils where the polymer content of polyol is higher than 65% iv. to produce polyurea and polyurethane by using the produced liquid plant oil based polyol as the starting material.

SUMMARY OF INVENTION

One aspect of the present invention is to provide a method to produce liquid plant oil based polyols from epoxidized plant oil in organic solvent in the presence of boron trifluoride diethylether.

A preferred aspect is where the organic solvent used is anhydrous dichloromethane and/or anhydrous chloroform and/or n-hexane.

The preferred aspect is where the amount of organic solvent used in polymerization reaction is 2 to 6 times (w/v) the amount of epoxidized oil.

A further aspect is where the epoxidized oil has moisture content of 0.5% or below.

Another aspect is where the epoxidized oil has oxirane oxygen content (OOC %) is between 1.5% to 7%.

A further aspect of the invention is to produce polyurethane and polyurea, where the polymeric polyols is reacted with excess diisocyanate and chain extender.

The present invention consists of features and a combination of parts hereinafter fully described above, it being understood that various changes in the details may be made without departing from the scope of the invention or sacrificing any of the advantages of the present invention.

DETAILED DESCRIPTION OF THE PREFERRED EMBODIMENTS

The present invention relates to a method to produce liquid polymeric polyols from epoxidized plant oils by ring-opening polymerization in an organic solvent in the presence of a catalyst to yield the desired polyols and using these polyols to produce polyurea and polyurethane. Hereinafter, this specification will describe the present invention according to the preferred embodiments of the present invention. However, it is to be understood that limiting the description to the preferred embodiments of the invention is merely to facilitate discussion of the present invention and it is envisioned that those skilled in the art may devise various modifications and equivalents without departing from the scope of the appended claims.

The present invention relates to a method for producing liquid plant oil based polyols comprises the step of polymerizing epoxidized oil in organic solvents with boron trifluoride-diethylether complex ($BF_3.Et_2O$) as the catalyst.

The term "epoxidized oil" used throughout the specification herein refers to both unsaturated oil and unsaturated fat derive from natural source like animals and plants. For the purpose of the present invention, any epoxidized oil derived from unsaturated oil can be employed in the disclosed method for producing the polyols. For example, but not limited to, epoxidized oil made from palm oil, soybean oil, coconut oil, groundnut oil, safflower oil, linseed oil, corn oil, sunflower oil, olive oil, canola oil, cottonseed oil, rapeseed oil, tung oil, fish oil, lard, tallow and any derivatives thereof such as fatty acid methyl ester. Moreover, it is also possible to mix plurality types of unsaturated oil to produce polyols possessing the desired properties such as low viscosity or high functionality which can be applied then for different applications.

Attention is now turned to the preparation of epoxidized oil from unsaturated oil. Any per-acid or peroxyacids or combination of peroxyacids can be employed to epoxidized the unsaturated oil. Representative examples, but not limited to, are peroxyformic acid, peroxyacetic acid, trifluoroperoxyacetic acid, benzyloxyperoxyformic acid, 3,5-dinitroperoxybenzoic acid, and m,-chloroperoxybenzoic acid. The peroxyacids can be pre-formed before reacting with the unsaturated oil or prepared in-situ in the reactor where the epoxidation process being carried out. No matter the peroxyacid is pre-formed or produced in-situ, the epoxidation has to be closely controlled within the favored reaction rate which can be achieved by adjusting the rate of adding or forming the peroxyacid in the unsaturated oil.

Alternatively, the epoxidized oil can be prepared from unsaturated oil by using transition metal based catalyst such as molybdenum and tungsten in combination with a phase transfer catalyst and hydrogen peroxide. Representative examples of molybdenum and tungsten based catalyst, but not limited to, are oxoperoxo(pyridine-2,6-dicarboxylato) molybdenum (VI) hydrate, tungsten powder, tungstic acid, sodium tungstate, peroxophosphotungstate complexes such as dodecylphosphonato-peroxotungstic acid tetrabutylammonium salt and methyltrioctylammonium tetrakis (diperoxotungsto) phosphates. Examples of phase transfer catalysis that can be used are Adogen 464 and Aliquat 336.

Preferably, the epoxidized oil used in the invention should be neutral with pH between 6.5 and 7.5 and the moisture content of the epoxidized oil should be below 0.5%. The iodine value of the epoxidized oil should be below 5 g I2/100 g sample and the oxirane oxygen content (OOC %) should be at least 1.5% and could be as high as 7%. The acid value of the epoxidized should be below 10 mg KOH/g sample.

In the present invention, the polymerization of epoxidized oil was conducted without any ring opening agent such as ethylene glycol, methanol and water. Instead, the polymerization of epoxidized oil was conducted in inert organic solvents in the presence of boron trifluoride-diethylether complex ($BF_3.Et_2O$) as the catalyst. It is well known in the art that higher catalyst concentration tends to cause undesired side reaction such as trans-esterification and giving cross-linked products that were insoluble in most solvents. The amount of $BF_3.Et_2O$ used in this invention preferably ranges from 0.03 mole to 0.1 mole of $BF_3.Et_2O$ to each mole of epoxy group of the epoxidized oil. The BF$_3$.Et$_2$O was added drop-wise to the epoxidized oil over 10 minutes, which was dissolved in an organic solvent and was stirred continuously.

Organic solvents that could be used to dissolve the epoxidized oil must be moisture free and do not cause side reaction. Examples of organic solvent that could be used, but not limited to, are n-hexane, anhydrous dichloromethane and anhydrous chloroform. The amount of solvent used in this invention was 2 to 6 times (w/v) the amount of epoxidized oil.

The polymerization of epoxidized oil with BF$_3$.Et$_2$O was conducted at room temperature with nitrogen blanket for 24 hours. Preferably, the temperature of the polymerization is between 20° C. and 40° C. to avoid side reaction such as trans-esterification. The duration of reaction is preferably between 4 hours to 6 hours. However, the polymerization could be left for 24 hours to maximize yield.

The present invention also includes purifying steps to clean the chemical residue in the produced polyols after the polymerization reaction to ensure the stability of the produced end products as well as it shelf life. The purifying steps include washing the produced polyols with deionized water; neutralizing acidic condition of the washed polyols with a base; and washing the neutralized polyols with deionized water until the pH of the neutralized polyols reaches 6.5 to 7.5 to remove the base residue. A further step involves drying the polyols over anhydrous magnesium sulfate, filter the polyols and removal of the organic solvent through rotary evaporator.

The properties of the liquid plant oil based polyols depend on the type of plant oil used as starting material. Typically, polymeric content of the purified liquid plant oil based polyols ranges from 65% to 90%. The hydroxyl value and the acid value ranges from 30 to 90 mg KOH/g sample and 1 to 14 mg KOH/g sample respectively. The number average molecular weight $M_n$ ranges from 800 Da to 16000 Da.

The produced liquid plant oil based polyols were used as raw material for the production of polyurethane and polyurea. For the production of polyurethane, there are two methods to utilize the plant oil based polyols as raw material. The first method is known one shot method, where the liquid plant oil based polyols were mixed directly with diisocyanate and a chain extender to yield polyurethane. The one shot method was conducted at 60° C. for 24 hours with chloroform as the solvent. Examples of chain extender that could be used are 1,4-butanediol, diethylene glycol, dipropylene glycol and polyethylene glycol (PEG) of various molecular weight. The diisocyanate used in this invention was 4,4'-methylene diphenyl diisocyanate (MDI). Other diisocyanate that could be used are toluene diisocyanate, naphthalene diisocyanate, hexamethylene diisocyanate and isophorone diisocyanate.

The second method involved converting the liquid plant oil based polyols to isocyanate terminated prepolymer by reacting the plant oil based polyols with excess MDI. The liquid plant oil based polyols was dissolved in chloroform and was reacted with excess diisocyanate at 60° C. for 24 hours to yield the isocyanate terminated prepolymer. The targeted NCO % of the prepolymer was about 15%. Then, the prepolymer was reacted with diol (chain extender) to form polyurethane by using similar reaction condition as in the preparation of the prepolymer.

Polyurea was produced from the liquid plant oil based polyols by first converting the liquid plant oil based polyols to isocyanate terminated prepolymer and then reacting the prepolymer with diamine to yield the desired polyurea. The prepolymer was produce by using similar method as described above in the preparation of polyurethane's prepolymer. Then, the prepolymer was reacted with diamine such as Jeffamine D2000 or Jeffamine D400 to yield polyurea at 60° C. for 24 hours with chloroform as the solvent.

The following examples are intended to further illustrate the invention, without any intent for the invention to be limited to the specific embodiments described therein.

EXAMPLE 1

Epoxidized methyl oleate (5 g, 16 mmol, OOC %=5) was charged into 50 ml reaction vessel and n-hexane (5 ml) was charged into the same vessel. The epoxidized methyl oleate was dissolved in n-hexane and the mixture was stirred throughout the reaction. The reaction vessel was purged with nitrogen gas to remove air and moisture. The reaction vessel was blanketed with nitrogen gas throughout the reaction and the temperature was kept at 20° C. Boron trifluoride-diethylether complex (BF$_3$.Et$_2$O, 48% BF$_3$ basis) (0.227 g, 1.6 mmol) was added drop-wise into the reaction mixture within 10 minutes time frame. The reaction was kept at 20° C. for 24 hours. After 24 hours, the reaction mixture was poured into a separating funnel. The reaction mixture was washed with deionized water (25 ml), neutralized with saturated sodium hydrogen carbonate solution (25 ml) and again washed with deionized water (25ml). The organic layer was dried over anhydrous magnesium sulfate. The dried organic layer was filtered and the n-hexane was removed through rotary evaporator. The collected weight of the desired polyol was 4.72 g. The polyol was a colorless liquid at room temperature. Gel permeation chromatography shows that the polymeric content of the polyol was about 95%. The methyl oleate based polyol has the following properties:
  a) Hydroxyl value (mg KOH/g sample): 74.5
  b) Acid value (mg KOH/g sample): 14.0
  c) Number average molecular weight, $M_n$:865

EXAMPLE 2

The same reaction in Example 1 was repeated with epoxidized cocoa butter (5 g, 6.5 mmol, OOC %=1.8) and the amount of n-hexane used was 10 ml, while the amount of boron trifluoride-diethylether complex (BF$_3$.Et$_2$O, 48% BF$_3$ basis) used was 0.092 g (0.65 mmol). The reaction was kept at 20° C. for 24 hours. The crude product was subjected to the same work up procedure as in Example 1. The collected weight of the desired polyol was 4.84 g. The polyol was a white solid at room temperature. The polyol has a melting point ranges from 21° C. to 24° C. Gel permeation chromatography shows that the polymeric content of the polyol was about 65%. The cocoa butter based polyol has the following properties:
  a) Hydroxyl value (mg KOH/g sample): 31.5
  b) Acid value (mg KOH/g sample): 3.1
  c) Number average molecular weight, $M_n$:6178

EXAMPLE 3

The same reaction in Example 1 was repeated with epoxidized palm olein (25 g, 57 mmol, OOC %=3.6) and the amount of n-hexane used was 150 ml, while the amount of boron trifluoride-diethylether complex (BF$_3$.Et$_2$O, 48% BF$_3$ basis) used was 0.28 g (1.9 mmol). The reaction was kept at 20° C. for 24 hours. After 24 hours, the reaction mixture was poured into a separating funnel. The reaction mixture was washed with deionized water (100 ml), neutralized with saturated sodium hydrogen carbonate solution (50 ml) and again washed with deionized water (100 ml). The organic layer was dried over anhydrous magnesium sulfate. The dried organic layer was filtered and the n-hexane was removed through rotary evaporator. The collected weight of the desired polyol was 24.24 g. The polyol was a yellowish viscous liquid at room temperature. Gel permeation chromatography shows that the polymeric content of the polyol was about 85%. The palm olein based polyol has the following properties:
  a) Hydroxyl value (mg KOH/g sample): 35.7
  b) Acid value (mg KOH/g sample): 0.5
  c) Number average molecular weight, $M_n$:18020

EXAMPLE 4

Epoxidized rapeseed oil (5 g, 21.2 mmol, OOC %=3.4) was charged into 50 ml reaction vessel and anhydrous dichloromethane (DCM) (25 ml) was charged into the same vessel. The epoxidized rapeseed oil was dissolved in DCM and the mixture was stirred throughout the reaction. The reaction vessel was purged with nitrogen gas to remove air and moisture. The reaction vessel was blanketed with nitrogen gas throughout the reaction. The reaction temperature was kept at 20° C. Anhydrous dichloromethane (DCM) (5 ml) was charged into another 10 ml reaction vessel, which has been purged with nitrogen gas. Then, boron trifluoride-diethylether complex ($BF_3.Et_2O$, 48% $BF_3$ basis) (0.09 g, 0.64 mmol) was dissolved into the anhydrous DCM. The $BF_3.Et_2O$/DCM mixture was added drop-wise to the epoxidized rapeseed oil/DCM mixture over 10 minutes. The reaction was kept at 20° C. for 24 hours. After 24 hours, the reaction mixture was poured into a separating funnel. The reaction mixture was washed with deionized water (25 ml), neutralized with saturated sodium hydrogen carbonate solution (25 ml) and again washed with deionized water (25 ml). The organic layer was dried over anhydrous magnesium sulfate. The dried organic layer was filtered and the DCM was removed through rotary evaporator. The collected weight of the desired polyol was 4.88 g. The polyol was a yellowish viscous liquid at room temperature. Gel permeation chromatography shows that the polymeric content of the polyol was about 77%. The rapeseed oil based polyol has the following properties:
  a) Hydroxyl value (mg KOH/g sample): 42.7
  b) Acid value (mg KOH/g sample): 3.5
  c) Number average molecular weight, $M_n$:9248

EXAMPLE 5

The reaction in Example 4 was repeated with epoxidized soybean oil (5 g, 22.4 mmol, OOC %=5). The amount of boron trifluoride-diethylether complex ($BF_3.Et_2O$, 48% $BF_3$ basis) used was (0.107 g, 0.756 mmol). The reaction was kept at 20° C. for 24 hours. The crude product was subjected to the same work up procedure as in Example 4. The collected weight of the desired polyol was 4.76 g. The polyol was a yellowish viscous liquid at room temperature. Gel permeation chromatography shows that the polymeric content of the polyol was about 82%. The soybean oil based polyol has the following properties:
  a) Hydroxyl value (mg KOH/g sample): 88.2
  b) Acid value (mg KOH/g sample): 8.0
  c) Number average molecular weight, $M_n$:9632

EXAMPLE 6

Liquid plant oil based polyol from Example 3 (2 g) was reacted with 4,4'-methylene diphenyl diisocyanate (MDI) (1.88 g) at 60° C. for 24 hours with chloroform (4 ml) as solvent. The final isocyanate content (NCO %) of the prepolymer was determined to be about 15%. The prepolymer (1.94 g) was then reacted with diamine (Jeffamine D2000, 6.92 g) at 60° C. for 24 hours with chloroform (85 ml) as solvent to yield polyurea. The polyurea was poured into a mold and was heated at 60° C. for another 24 hours to remove the solvent and to form the desired product. The dry film of polyurea was demold and was left to cure at room temperature for 3 days. The polyurea film was flexible and semi-transparent.

EXAMPLE 7

Liquid plant oil based polyol from Example 3 (1 g) and 1,4-butanediol (0.052 g) was dissolved in chloroform (2 ml) and then the mixture was reacted with 4,4'-methylene diphenyl diisocyanate (MDI) (0.22 g) at 60° C. for 24 hours to yield polyurethane. The polyurethane was poured into a mold and was heated at 60° C. for another 24 hours to remove the solvent and to form the desired product. The polyurethane was demold and was left to cure at room temperature for 3 days. The polyurethane was a flexible solid with 20% hard segment.

EXAMPLE 8

Liquid plant oil based polyol from Example 3 (1 g) and polyethylene glycol (PEG 3350) (0.964 g) was dissolved in chloroform (4 ml) and then the mixture was reacted with 4,4'-methylene diphenyl diisocyanate (MDI) (0.15 g) at 60° C. for 24 hours to yield polyurethane.

The polyurethane was poured into a mold and was heated at 60° C. for another 24 hours to remove the solvent and to form the desired product. The polyurethane was demold and was left to cure at room temperature for 3 days. The polyurethane was a flexible solid with 7% hard segment.

The invention claimed is:

1. A method to produce liquid polymeric polyol from epoxidized plant oil, the method comprising:
  polymerizing epoxidized plant oil in an inert organic solvent in the presence of a boron trifluoride diethylether catalyst at a temperature between 20° C. to 40° C. and in a blanket of inert gas, wherein the polymerization is conducted with a ring opening chemical that is the epoxy group of the epoxidized plant oil;
  pouring a mixture resulting from the polymerization of the epoxidized plant oil into a separating funnel;
  washing the filtered mixture with water to produce an organic layer;
  drying the organic layer over anhydrous magnesium sulfate;
  filtering the organic layer; and
  removing the inert organic solvent from the organic layer using an evaporator to produce a polymeric polyol.

2. The method according to claim 1, wherein the inert organic solvent used is at least one of anhydrous dichloromethane, anhydrous chloroform and n-hexane.

3. The method according to claim 1, wherein the amount of inert organic solvent used in polymerization reaction is 2 to 6 times (w/v) the amount of epoxidized plant oil.

4. The method according to claim 1, wherein the epoxidized plant oil has a moisture content of 0.5% or below.

5. The method according to claim 1, wherein the epoxidized plant oil has an oxirane oxygen content (OOC%) of 1.5% to 7%.

6. The method according to claim 1, wherein the polymeric polyol has 65% to 95% polymeric content.

7. The method according to claim 1, wherein the polymeric polyol has a hydroxyl value of 30 to 90 mg KOH / g sample.

8. The method according to claim 1, wherein the polymeric polyol has an acid value of 1 to 14 mg KOH/g sample.

9. The method according to claim 1, wherein the polymeric polyol has an average molecular weight of 800 Da to 16000 Da.

10. The method according to claim 1, wherein the amount of boron trifluoride diethylether complex is between 0.03 mole to 0.1 mole of $BF_3.Et_2O$ to each mole of epoxy group of the epoxidized plant oil.

11. The method according to claim 1, wherein the polymerization of epoxidized oil was conducted by a drop-wise addition of $BF_3.Et_2O$ complex.

12. The method according to claim 1, wherein the polymerization is conducted for between 8 to 24 hours.

13. The method according to claim 1, wherein the polymeric polyol is used as raw material for the production of polyurethane and polyurea.

14. A method to produce polyurethane, the method comprising:
polymerizing epoxidized plant oil in an inert organic solvent in the presence of a boron trifluoride diethylether catalyst at a temperature between 20° C. to 40° C. and in a blanket of inert gas, wherein the polymerization is conducted with a ring opening chemical that is the epoxy group of the epoxidized plant oil;
pouring a mixture resulting from the polymerization of the epoxidized plant oil into a separating funnel;
washing the filtered mixture with water to produce an organic layer;
drying the organic layer over anhydrous magnesium sulfate;
filtering the organic layer;
removing the inert organic solvent from the organic layer using an evaporator to produce a polymeric polyol; and
reacting said polymeric polyol with excess diisocyanate and chain extender.

15. The method according to claim 14, wherein the diisocyanate is 4,4'-methylene diphenyl diisocyanate.

16. The method according to claim 14, wherein the chain extender is selected from the group consisting of: 1,4-butanediol, diethylene glycol, dipropylene glycol and polyethylene glycol (PEG).

17. A method to produce polyurea comprising:
polymerizing epoxidized plant oil in an inert organic solvent in the presence of a boron trifluoride diethylether catalyst at a temperature between 20° C. to 40° C. and in a blanket of inert gas, wherein the polymerization is conducted with a ring opening chemical that is the epoxy group of the epoxidized plant oil;
pouring a mixture resulting from the polymerization of the epoxidized plant oil into a separating funnel;
washing the filtered mixture with water to produce an organic layer;
drying the organic layer over anhydrous magnesium sulfate;
filtering the organic layer;
removing the inert organic solvent from the organic layer using an evaporator to produce a polymeric polyol; and
reacting said polymeric polyol with excess diisocyanate to produce isocyanate terminated prepolymer.

18. The method according to claim 17 further comprising a step of reacting the isocyanate terminated prepolymer with diamine to produce polyurea.

19. The method according to claim 18, wherein the diamine can be selected from one of: a bifunctional amine having an average molecular weight of 400 or a bifunctional amine having an average molecular weight of 2000.

* * * * *